United States Patent
Huang et al.

(10) Patent No.: US 12,050,741 B1
(45) Date of Patent: Jul. 30, 2024

(54) TOUCHPAD MODULE AND COMPUTING DEVICE USING SAME

(71) Applicant: Primax Electronics Ltd., Taipei (TW)

(72) Inventors: Wei-Chiang Huang, Taipei (TW); Hung-Wei Kuo, Taipei (TW); Chao-Wei Lee, Taipei (TW); Ying-Yen Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/119,036

(22) Filed: Mar. 8, 2023

(30) Foreign Application Priority Data

Jan. 6, 2023 (TW) ................................. 112100518

(51) Int. Cl.
*G06F 3/0354* (2013.01)
*G06F 1/16* (2006.01)

(52) U.S. Cl.
CPC .......... *G06F 3/03547* (2013.01); *G06F 1/169* (2013.01)

(58) Field of Classification Search
CPC .............................. G06F 3/03547; G06F 1/169
See application file for complete search history.

(56) References Cited

U.S. PATENT DOCUMENTS

| 10,509,490 | B2 * | 12/2019 | Huang | G06F 3/03547 |
| 10,510,499 | B1 * | 12/2019 | Huang | G06F 1/169 |
| 10,606,377 | B1 * | 3/2020 | Huang | G06F 1/169 |
| 2018/0081477 | A1 * | 3/2018 | Picciotto | G06F 3/044 |

* cited by examiner

*Primary Examiner* — Sahlu Okebato
(74) *Attorney, Agent, or Firm* — KIRTON McCONKIE; Evan R. Witt (57) ABSTRACT

A touchpad module for a computing device is provided. A fixing frame is concavely formed in a casing of the computing device. The fixing frame includes a supporting part. The touchpad module is installed within the fixing frame. The touchpad module includes a touch member and a pressure sensing element. The touch member includes a covering plate and a circuit board. An edge part of covering plate is supported on the supporting part. The pressure sensing element is installed on the touch member and electrically connected with the circuit board. While the touch member is pressed, the touch member is bent downwardly. Consequently, the touch member has a deformation amount. According to the deformation amount, a magnitude of a pressing force exerted on the touch member is sensed, and a pressure sensing signal is generated.

20 Claims, 5 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device. For example, in case that the user's finger is placed on the touchpad and slid on the touchpad, a cursor shown on a display screen is correspondingly moved. Moreover, in case that the touchpad is pressed down by the user's finger, the electronic device executes a specified function. The use of the touchpad can implement some functions of the conventional mouse. In other words, the user may operate the electronic device through the touchpad without the need of additionally carrying or installing the mouse.

Nowadays, more and more touchpads are equipped with pressure sensors. When the user's finger presses the touchpad, a pressing force of the user applied to the touchpad is detected by the pressure sensor. Consequently, a pressure sensing signal is outputted. According to the pressure sensing signal, the electronic device executes the corresponding function. Recently, in most of the touchpads, the pressure sensor is installed on a metal base plate, or a cantilever structure is formed on the metal base plate and then the pressure sensor is installed on the cantilever structure. In case that the touchpad is pressed, the metal base plate or cantilever structure is pushed and subjected to deformation. According to the deformation amount of the cantilever structure, the pressure sensor senses the magnitude of the pressing force that is exerted on the touchpad.

However, the structure of the conventional touchpad with the pressure sensing function is complicated, the conventional touchpad is manufactured with difficulty. For example, plural cantilever structures have to be formed on a metallic base plate of the touchpad by a stamping process or other fabricating methods. Consequently, the fabricating cost of the touchpad is high. In addition, the mechanism of sensing the deformation amount of the metallic base plate usually has insufficient structural strength. Since the travel distance of pressing the touchpad is too large, the tactile feel is usually unsatisfactory to the user.

Therefore, there is a need of providing an improved touchpad module in order to overcome the above drawbacks.

SUMMARY OF THE INVENTION

An object of the present invention provides a touchpad module. Due to the special design, the structure of the touchpad module is simplified, and the fabricating cost is effectively reduced. In addition, the structural strength is enhanced, and the use life is largely increased.

Another object of the present invention provides a computing device with a touchpad module. The structure of the touchpad module is simplified, and the fabricating cost is effectively reduced. In addition, the structural strength is enhanced, and the use life is largely increased.

The other objects and advantages of the present invention will be understood from the disclosed technical features.

In accordance with an aspect of the present invention, a touchpad module for a computing device is provided. The computing device includes a casing. A fixing frame is concavely formed in the casing. The fixing frame includes a lateral wall and a supporting part. The supporting part is extended from the lateral wall. The touchpad module is installed within the fixing frame. The touchpad module includes a touch member and at least one pressure sensing element. The touch member includes a covering plate and a circuit board. The covering plate is located over the circuit board. The covering plate includes an edge part. The edge part of the covering plate is supported on the supporting part of the fixing frame. The at least one pressure sensing element is installed on the touch member and electrically connected with the circuit board. While the touch member is pressed in response to an external pressing force, the touch member is bent downwardly by using a junction between the edge part of the covering plate and the supporting part of the fixing frame as a fulcrum. Consequently, the touch member has a deformation amount. According to the deformation amount of the touch member, a magnitude of the pressing force exerted on the touch member is sensed by the at least one pressure sensing unit, and the pressure sensing unit issues a pressure sensing signal.

In an embodiment, the covering plate includes a top surface and a bottom surface, which are opposed to each other. The at least one pressure sensing unit is installed on the bottom surface of the covering plate. The at least one pressure sensing unit is arranged between the covering plate and the circuit board.

In an embodiment, the circuit board includes a top surface and a bottom surface, which are opposed to each other. The at least one pressure sensing unit is installed on the bottom surface of the circuit board. The circuit board is arranged between the covering plate and the at least one pressure sensing unit.

In an embodiment, the circuit board further includes a lateral surface, and the lateral surface of the circuit board is arranged between the top surface and the bottom surface of the circuit board. The supporting part of the fixing frame includes a supporting surface and an end surface. The supporting surface and the end surface are connected with each other. The supporting surface of the supporting part faces the edge part of the covering plate. The end surface of the supporting part is in parallel with the lateral wall of the fixing frame. The lateral surface of the circuit board faces the end surface of the supporting part.

In an embodiment, there is a gap between the lateral surface of the circuit board and the end surface of the supporting part.

In an embodiment, the lateral surface of the circuit board and the end surface of the supporting part are contacted with each other.

In an embodiment, the touch member has a haptic feedback function.

In accordance with another aspect of the present invention, a touchpad module for a computing device is provided. The computing device includes a casing. A fixing frame is concavely formed in the casing. The fixing frame includes a lateral wall and a supporting part. The supporting part is extended from the lateral wall. The touchpad module is installed within the fixing frame. The touchpad module includes a base plate, a touch member, a supporting element and at least one pressure sensing element. The touch member is located over the base plate. The touch member includes a covering plate and a circuit board. The covering plate is located over the circuit board. The covering plate includes an edge part. The edge part of the covering plate is supported on the supporting part of the fixing frame. The supporting element is arranged between the base plate and the touch member. The at least one pressure sensing element is installed on the touch member and electrically connected with the circuit board. While the touch member is pressed in response to an external pressing force, the touch member is bent downwardly by using a junction between the edge part of the covering plate and the supporting part of the fixing frame as a fulcrum. While the touch member is bent downwardly, the base plate is pushed by the touch member through the supporting element. Consequently, the base plate has a displacement amount. According to the displacement amount of the base plate, the pressing force exerted on the touch member is sensed by the at least one pressure sensing unit, and the pressure sensing unit issues a pressure sensing signal.

In accordance with another aspect of the present invention, a computing device is provided. The computing device includes a casing, a processor and a touchpad module. A fixing frame is concavely formed in the casing. The fixing frame includes a lateral wall and a supporting part. The supporting part is extended from the lateral wall. The processor is disposed within the casing. The touchpad module is disposed within the fixing frame and electrically connected with the processor. The touchpad module includes a touch member and at least one pressure sensing element. The touch member includes a covering plate and a circuit board. The covering plate is located over the circuit board. The covering plate includes an edge part. The edge part of the covering plate is supported on the supporting part of the fixing frame. The at least one pressure sensing element is installed on the touch member and electrically connected with the circuit board. While the touch member is pressed in response to an external pressing force, the touch member is bent downwardly by using a junction between the edge part of the covering plate and the supporting part of the fixing frame as a fulcrum. Consequently, the touch member has a deformation amount. According to the deformation amount of the touch member, a magnitude of the pressing force exerted on the touch member is sensed by the at least one pressure sensing unit, and the pressure sensing unit issues a pressure sensing signal.

In accordance with another aspect of the present invention, a computing device is provided. The computing device includes a casing, a processor and a touchpad module. A fixing frame is concavely formed in the casing. The fixing frame includes a lateral wall and a supporting part. The supporting part is extended from the lateral wall. The processor is disposed within the casing. The touchpad module is disposed within the fixing frame and electrically connected with the processor.

The touchpad module includes a base plate, a touch member, a supporting element and at least one pressure sensing element. The touch member is located over the base plate. The touch member includes a covering plate and a circuit board. The covering plate is located over the circuit board. The covering plate includes an edge part. The edge part of the covering plate is supported on the supporting part of the fixing frame. The supporting element is arranged between the base plate and the touch member. The at least one pressure sensing element is installed on the touch member and electrically connected with the circuit board. While the touch member is pressed in response to an external pressing force, the touch member is bent downwardly by using a junction between the edge part of the covering plate and the supporting part of the fixing frame as a fulcrum. While the touch member is bent downwardly, the base plate is pushed by the touch member through the supporting element. Consequently, the base plate has a displacement amount. According to the displacement amount of the base plate, the pressing force exerted on the touch member is sensed by the at least one pressure sensing unit, and the pressure sensing unit issues a pressure sensing signal.

From the above descriptions, the present invention provides the touchpad module and the computing device using the touchpad module. In the touchpad module of the present invention, the touch member is supported on the supporting part of the fixing frame of the computing device through the edge part of the covering plate. While the touch member is pressed in response to an external pressing force, the touch member is bent downwardly by using the junction between the edge part of the covering plate and the supporting part of the fixing frame as a fulcrum. Consequently, the touch member has a downward deformation amount. According to the downward deformation amount of the touch member or the displacement of the base plate pushed by the touch member, a magnitude of the pressing force exerted on the touch member is sensed by the pressure sensing unit. Consequently, the pressure sensing unit issues a corresponding pressure sensing signal. Due to this structural design, it is not necessary to additionally install plural cantilever structures on the base plate. Since the structure of the touchpad module is simplified and the touchpad module is assembled easily, the fabricating cost and the overall weight of the touchpad module are effectively reduced. Moreover, the covering plate of the touch member is directly supported on the supporting part of the fixing frame. While the touch member is pressed in response to the external pressing force, the downward deformation amount of the touch member is controlled according to the structural strength of the covering plate. Consequently, since the travel distance of pressing the touchpad module is effectively reduced, the tactile feel is satisfactory to the user.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
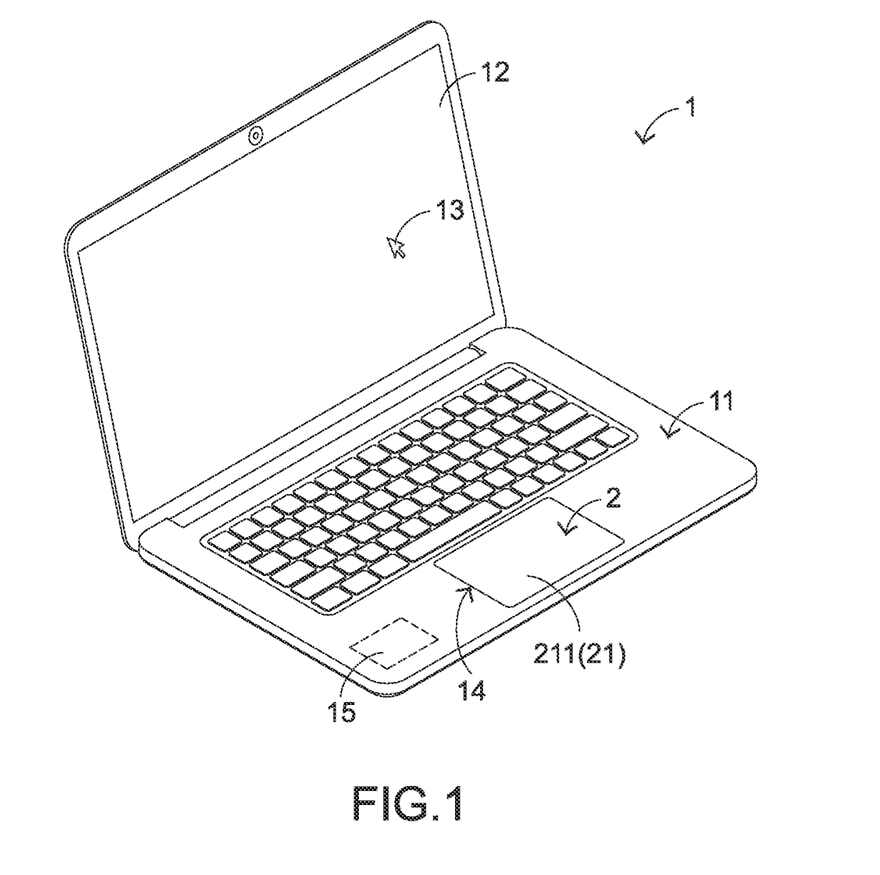
FIG. 1 is a schematic perspective view illustrating the outer appearance of a computing device with a touchpad module according to a first embodiment of the present invention.

FIG. 1 is a schematic perspective view illustrating the outer appearance of a computing device with a touchpad module according to a first embodiment of the present invention. An example of the computing device 1 includes but is not limited to a notebook computer. In an embodiment, the computing device 1 comprises a casing 11, a display screen 12, a processor 15 and a touchpad module 2. The processor 15 is disposed within the casing 11. The processor 15 is used for processing electronic signals of the computing device 1. Moreover, a fixing frame 14 is concavely formed in the casing 11. The fixing frame 14 comprises a lateral wall 141 and a supporting part 142 (see FIG. 2). The supporting part 142 is extend from the lateral wall 141. The touchpad module 2 is disposed within the fixing frame 14 and electrically connected with the processor 15. When the touchpad module 2 is disposed within the fixing frame 14, the touchpad module 2 is enclosed by the lateral wall 141 of the fixing frame 14, and at least a portion of the touchpad module 2 is exposed outside so as to be touched by the user's finger. Consequently, the user can operate the touchpad module 2 to control the computing device 1. For example, in case that the user's finger is placed on the touchpad module 2 and slid on the touchpad module 2, a cursor 13 shown on the display screen 12 is correspondingly moved. Moreover, in case that the touchpad module 2 is pressed down by the user's finger, the computing device 1 executes a specified function.

The other structure of the touchpad module 2 will be described in more details as follows.

Figure 2:
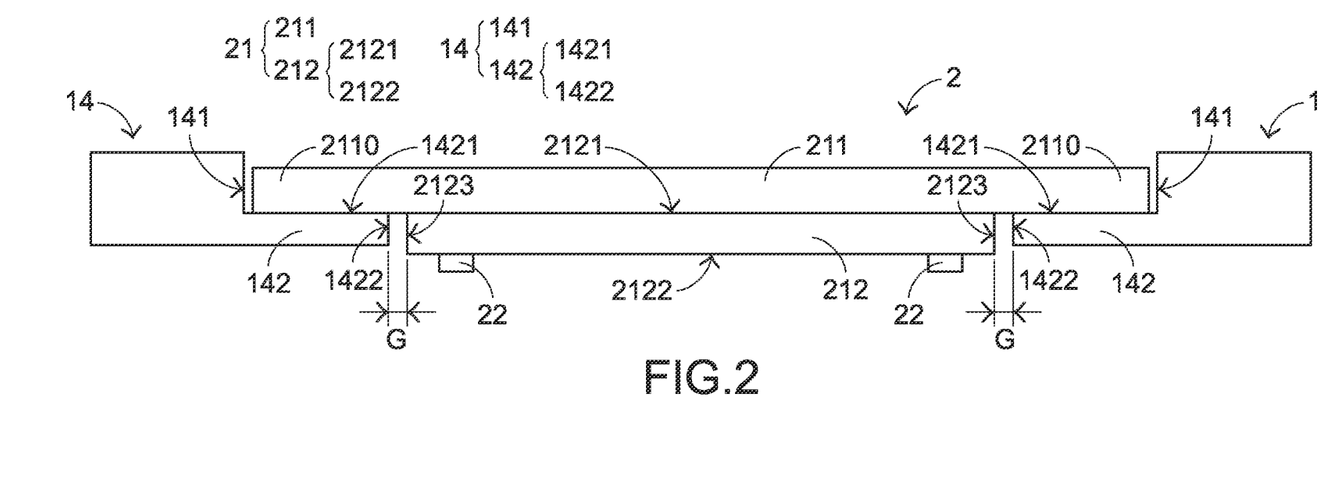
FIG. 2 is a schematic cross-sectional view illustrating portions of the fixing frame and the touchpad module of the computing device as shown in FIG. 1.
Figure 3:
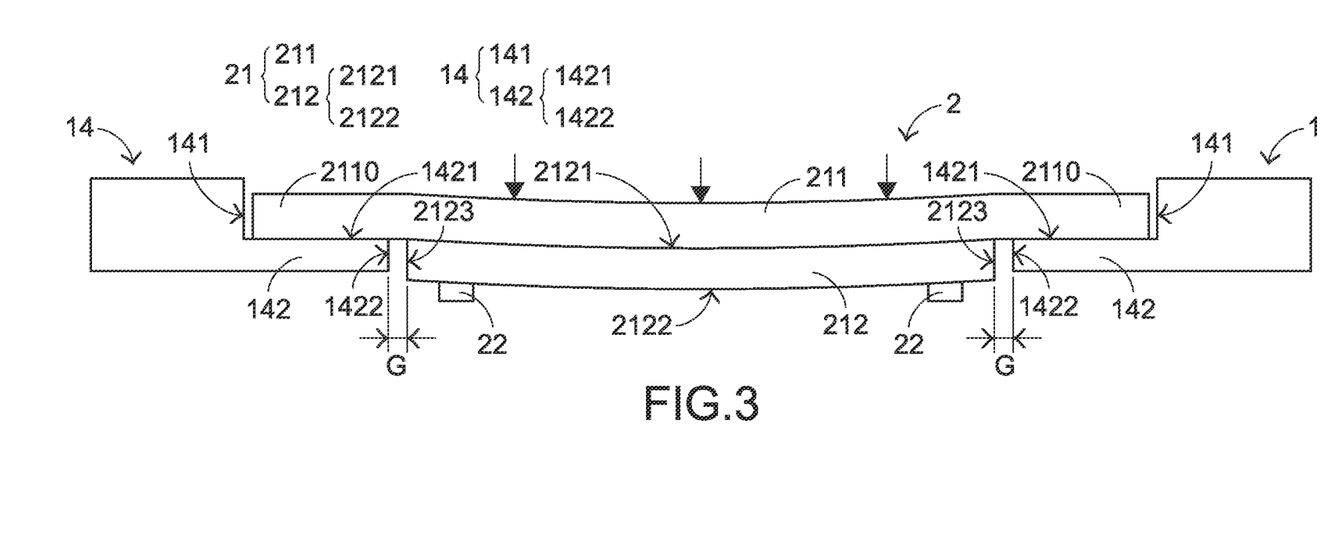
FIG. 3 is a schematic cross-sectional view illustrating the touchpad module as shown in FIG. 2 and in a pressed state.

Please refer to FIGS. 2 and 3. FIG. 2 is a schematic cross-sectional view illustrating portions of the fixing frame and the touchpad module of the computing device as shown in FIG. 1. FIG. 3 is a schematic cross-sectional view illustrating the touchpad module as shown in FIG. 2 and in a pressed state.

As shown in FIGS. 2 and 3, the touchpad module 2 comprises a touch member 21 and at least one pressure sensing element 22. The touch member 21 comprises a covering plate 211 and a circuit board 212. The covering plate 211 of the touch member 21 is located over the circuit board 212. The covering plate 211 comprises an edge part 2110. The touch member 21 is supported on the supporting part 142 of the fixing frame 14 of the computing device 1 through the edge part 2110 of the covering plate 211. The at least one pressure sensing element 22 is installed on the touch member 21. In addition, the at least one pressure sensing element 22 is electrically connected with the circuit board 212 of the touch member 21.

While the touch member 21 is pressed in response to an external pressing force, the touch member 21 is bent downwardly by using the junction between the edge part 2110 of the covering plate 211 and the supporting part 142 of the fixing frame 14 as a fulcrum. In other words, the touch member 21 has a downward deformation amount. According to the downward deformation amount of the touch member 21, the magnitude of the pressing force exerted on the touch member 21 is sensed by the at least one pressure sensing unit 22. Consequently, the pressure sensing unit 22 issues a corresponding pressure sensing signal.

As mentioned above, the covering plate 211 of the touch member 21 is directly supported on the fixing frame 14. The structural strength of the fixing frame 14 is relatively stronger. Consequently, the touch member 21 of the touchpad module 2 can withstand a larger pressing force. Even if the touchpad module 2 has been repeatedly pressed for many times, the tactile feel of the touchpad module 2 is still satisfied. In addition, the use life of the touchpad module 2 is largely prolonged.

Preferably but not exclusively, the covering plate 211 is made of glass or any other appropriate material. The material of the covering plate 211 may be varied according to the practical requirements. Moreover, the circuit board 212 and the covering plate 211 are combined together through a pressure sensitive adhesive (PSA) or any other appropriate material. In this embodiment, the at least one pressure sensing unit 22 includes two pressure sensing units 22. It is noted that the number of the at least one pressure sensing unit 22 is not restricted. For example, in some other embodiments, the number of the at least one pressure sensing unit 22 is one or more than two.

In this embodiment, the touch member 21 has a haptic feedback function. That is, the touch member 21 is equipped with a linear resonant actuator (LRA), a piezoelectric element (PIEZO) or any other appropriate feedback element (not shown). When the pressure sensing unit 22 issues the pressure sensing signal according to the downward deformation amount of the touch member 21, a control unit (not shown) on the circuit board 212 drives the feedback element to generate a haptics feedback effect (i.e., a vibration-like feedback effect) according to the pressure sensing signal.

Please refer to FIGS. 2 and 3 again. In this embodiment, the circuit board 212 of the touch member 21 comprises a top surface 2121 and a bottom surface 2122, which are opposed to each other. The at least one pressure sensing unit 22 is installed on the bottom surface 2122 of the circuit board 212. In addition, the circuit board 212 is arranged between the covering plate 211 and the at least one pressure sensing unit 22. Due to this structural design, the following benefits are generated. While the touch member 21 is bent downwardly by using the junction between the edge part 2110 of the covering plate 211 and the supporting part 142 of the fixing frame 14 as the fulcrum, the magnitude of the pressing force exerted on the touch member 21 can be immediately sensed by the at least one pressure sensing unit 22 according to the downward deformation amount of the touch member 21. Consequently, the pressure sensing unit 22 issues the corresponding pressure sensing signal.

Please refer to FIGS. 2 and 3 again. In an embodiment, the circuit board 212 of the touch member 21 further comprises a lateral surface 2123. The supporting part 142 of the fixing frame 14 comprises a supporting surface 1421 and an end surface 1422, which are connected with each other. The lateral surface 2123 of the circuit board 212 is arranged between the top surface 2121 and the bottom surface 2122 of the circuit board 212. The supporting surface 1421 of the supporting part 142 faces the edge part 2110 of the covering plate 211. The edge part 2110 of the covering plate 211 is supported on the supporting surface 1421 of the supporting part 142. The end surface 1422 of the supporting part 124 and the lateral wall 141 of the fixing frame 14 are in parallel with each other. In addition, the lateral surface 2123 of the circuit board 212 faces the end surface 1422 of the supporting part 142. In this embodiment, there is a gap G between the lateral surface 2123 of the circuit board 212 and the end surface 1422 of the supporting part 142.

Figure 4:
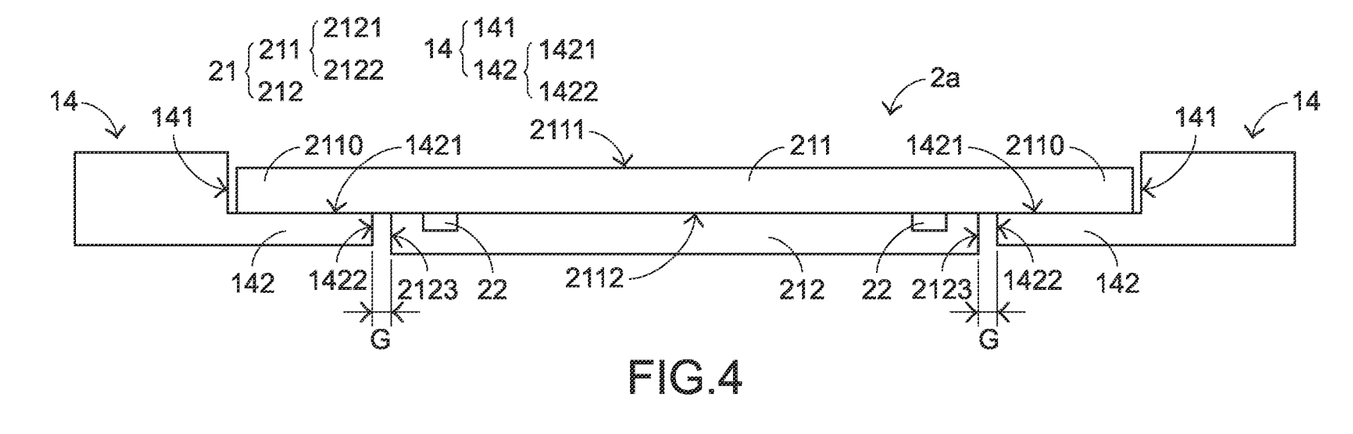
FIG. 4 is a schematic cross-sectional view illustrating portions of the fixing frame and the touchpad module of the computing device according to a second embodiment of the present invention.

Please refer to FIG. 4. FIG. 4 is a schematic cross-sectional view illustrating portions of the fixing frame and the touchpad module of the computing device according to a second embodiment of the present invention.

Except for the position of the pressure sensing unit 22, the other components of the touchpad module 2a of this embodiment are similar to those of the touchpad module 2 as shown in FIGS. 2 and 3. In this embodiment, the covering plate 211 of the touchpad module 2a comprises a top surface 2111 and a bottom surface 2112, which are opposed to each other. The top surface 2111 of the covering plate 211 may be pressed or slid by user's finger. The at least one pressure sensing unit 22 is installed on the bottom surface 2112 of the covering plate 211. In addition, the at least one pressure sensing unit 22 is arranged between the covering plate 211 and the circuit board 212. Due to this structural design, the magnitude of the pressing force exerted on the touch member 21 can be immediately sensed by the at least one pressure sensing unit 22 according to the downward deformation amount of the touch member 21. Consequently, the pressure sensing unit 22 issues the corresponding pressure sensing signal.

Figure 5:
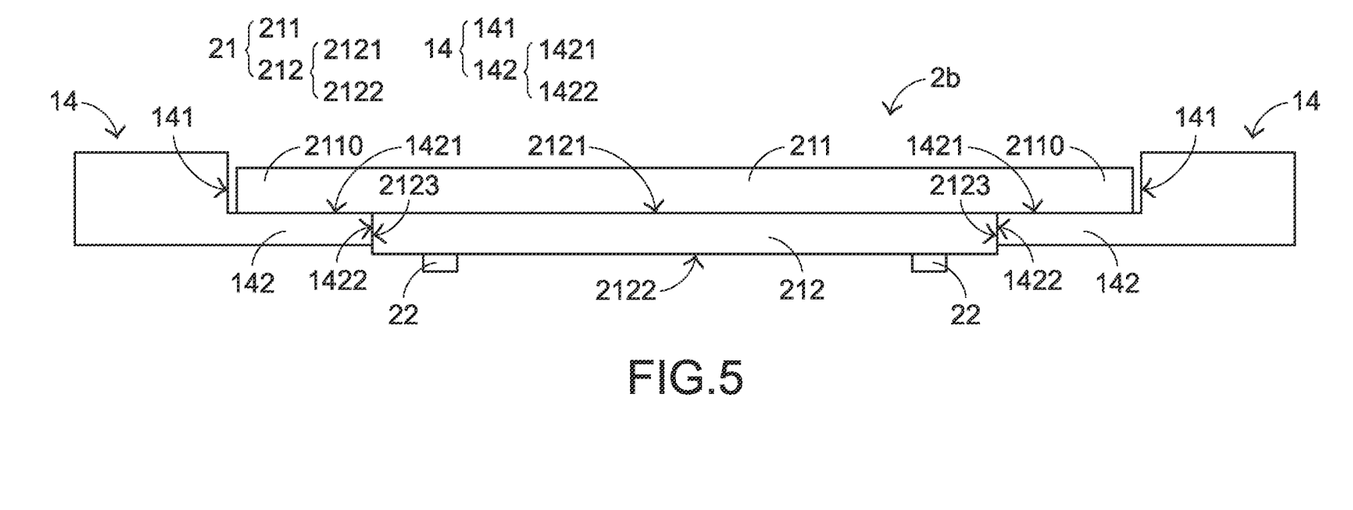
FIG. 5 is a schematic cross-sectional view illustrating portions of the fixing frame and the touchpad module of the computing device according to a third embodiment of the present invention.

Please refer to FIG. 5. FIG. 5 is a schematic cross-sectional view illustrating portions of the fixing frame and the touchpad module of the computing device according to a third embodiment of the present invention. Except for the touch member 21, the other components of the touchpad module 2b of this embodiment are similar to those of the touchpad module 2 as shown in FIGS. 2 and 3. In the touchpad module 2b of this embodiment, the lateral surface 2123 of the circuit board 212 of the touch member 21 are contacted with the end surface 1422 of the supporting part 142. Due to this structural design, the structure of the touchpad module 2b is largely increased. Consequently, the touch member 21 of the touchpad module 2b can withstand a larger pressing force. Even if the touchpad module 2b has been repeatedly pressed for many times, the tactile feel of the touchpad module 2b is still satisfied.

Figure 6:
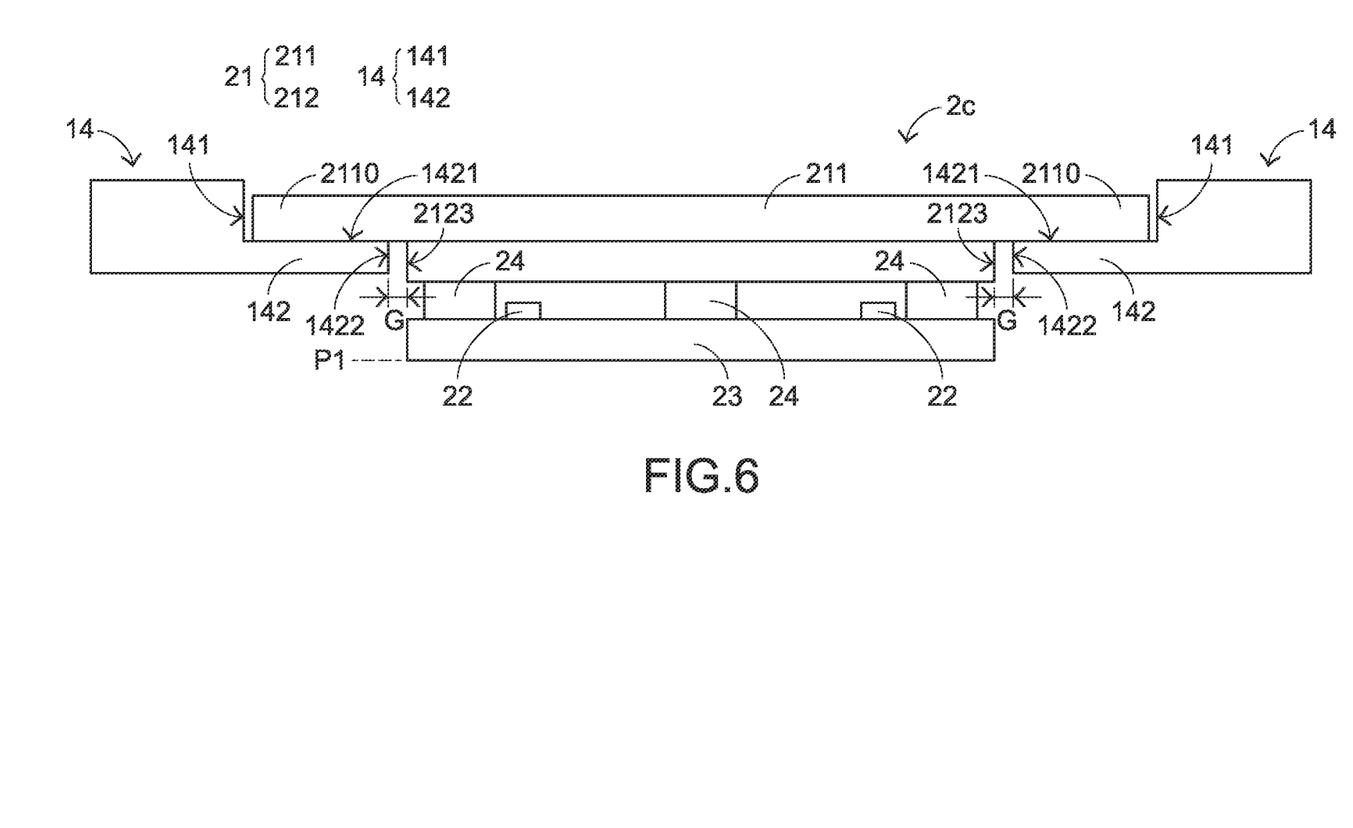
FIG. 6 is a schematic cross-sectional view illustrating portions of the fixing frame and the touchpad module of the computing device according to a fourth embodiment of the present invention.
Figure 7:
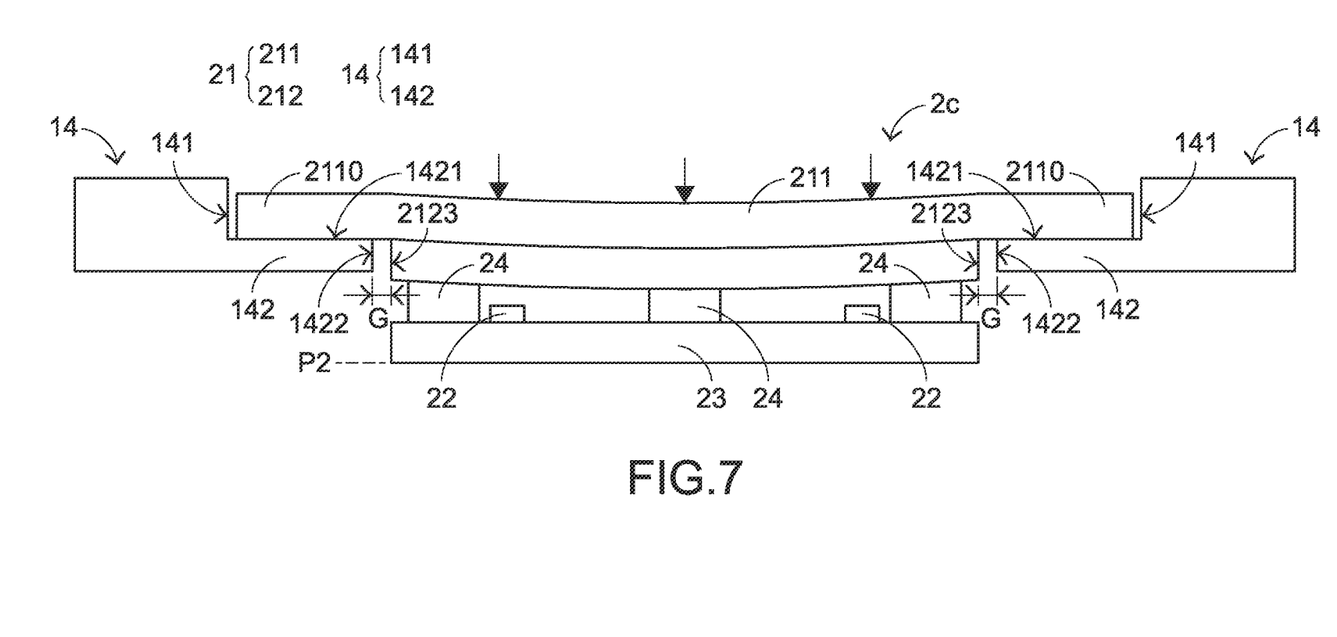
FIG. 7 is a schematic cross-sectional view illustrating the touchpad module as shown in FIG. 6 and in a pressed state.

Please refer to FIGS. 6 and 7. FIG. 6 is a schematic cross-sectional view illustrating portions of the fixing frame and the touchpad module of the computing device according to a fourth embodiment of the present invention. FIG. 7 is a schematic cross-sectional view illustrating the touchpad module as shown in FIG. 6 and in a pressed state.

In comparison with the touchpad module 2 as shown in FIGS. 2 and 3, the touchpad module 2c of this embodiment further comprises a base plate 23 and a supporting element 24. The touch member 21 is located over the base plate 23. That is, the circuit board 212 of the touch member 21 is arranged between the covering plate 211 and the base plate 23. The supporting element 24 is arranged between the touch member 21 and the base plate 23. The at least one pressure sensing unit 22 is installed on the base plate 23. In addition, the at least one pressure sensing unit 22 is electrically connected with the circuit board 212 of the touch member 21.

While the touch member 21 is pressed in response to an external pressing force, the touch member 21 is bent downwardly in the direction toward the base plate 23 by using the junction between the edge part 2110 of the covering plate 211 and the supporting part 142 of the fixing frame 14 as the fulcrum. Moreover, as the touch member 21 is bent downwardly, the base plate 23 is pushed by the supporting element 24 and moved downwardly. Since the base plate 23 is moved from a first position P1 to a second position P2, the base plate 23 has a displacement amount. According to the displacement amount of the base plate 23, the magnitude of the pressing force exerted on the touch member 21 is sensed by the at least one pressure sensing unit 22. Consequently, the pressure sensing unit 22 issues a corresponding pressure sensing signal.

From the above descriptions, the present invention provides the touchpad module and the computing device using the touchpad module. In the touchpad module of the present invention, the touch member is supported on the supporting part of the fixing frame of the computing device through the edge part of the covering plate. While the touch member is pressed in response to an external pressing force, the touch member is bent downwardly by using the junction between the edge part of the covering plate and the supporting part of the fixing frame as a fulcrum. Consequently, the touch member has a downward deformation amount. According to the downward deformation amount of the touch member or the displacement of the base plate pushed by the touch member, the magnitude of the pressing force exerted on the touch member is sensed by the at least one pressure sensing unit. Consequently, the pressure sensing unit issues a corresponding pressure sensing signal. Due to this structural design, it is not necessary to additionally install plural cantilever structures on the base plate. Since the structure of the touchpad module is simplified and the touchpad module is assembled easily, the fabricating cost and the overall weight of the touchpad module are effectively reduced. Moreover, the covering plate of the touch member is directly supported on the supporting part of the fixing frame. While the touch member is pressed in response to the external pressing force, the downward deformation amount of the touch member is controlled according to the structural strength of the covering plate. Consequently, since the travel distance of pressing the touchpad module is effectively reduced, the tactile feel is satisfactory to the user.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the computing device comprising a casing, a fixing frame being concavely formed in the casing, the fixing frame comprising a lateral wall and a bottom part, the bottom part being extended from the lateral wall, the touchpad module being installed within the fixing frame, the touchpad module comprising:
   a touch member comprising a covering plate and a circuit board, wherein the covering plate is located over the circuit board, the covering plate comprises an edge part, and the edge part of the covering plate is supported on the bottom part of the fixing frame, and the circuit board is laterally adjacent to the bottom part of the fixing frame; and
   at least one pressure sensing element installed on the touch member and electrically connected with the circuit board, wherein while the touch member is pressed in response to an external pressing force, the touch member is bent downwardly by using a junction between the edge part of the covering plate and the bottom part of the fixing frame as a fulcrum, so that the touch member has a deformation amount, wherein according to the deformation amount of the touch member, a magnitude of the pressing force exerted on the touch member is sensed by the at least one pressure sensing unit, and the pressure sensing unit issues a pressure sensing signal.

2. The touchpad module according to claim 1, wherein the covering plate comprises a top surface and a bottom surface, which are opposed to each other, wherein the at least one pressure sensing unit is installed on the bottom surface of the covering plate, and the at least one pressure sensing unit is arranged between the covering plate and the circuit board.

3. The touchpad module according to claim 1, wherein the circuit board comprises a top surface and a bottom surface, which are opposed to each other, wherein the at least one pressure sensing unit is installed on the bottom surface of the circuit board, and the circuit board is arranged between the covering plate and the at least one pressure sensing unit.

4. The touchpad module according to claim 3, wherein the circuit board further comprises a lateral surface, and the lateral surface of the circuit board is arranged between the top surface and the bottom surface of the circuit board, wherein the bottom part of the fixing frame comprises a supporting surface and an end surface, the supporting surface and the end surface are connected with each other, the supporting surface of the bottom part faces the edge part of the covering plate, the end surface of the bottom part is in parallel with the lateral wall of the fixing frame, and the lateral surface of the circuit board faces the end surface of the bottom part.

5. The touchpad module according to claim 4, wherein there is a gap between the lateral surface of the circuit board and the end surface of the bottom part.

6. The touchpad module according to claim 4, wherein the lateral surface of the circuit board and the end surface of the bottom part are contacted with each other.

7. The touchpad module according to claim 1, wherein the touch member has a haptic feedback function.

8. A touchpad module for a computing device, the computing device comprising a casing, a fixing frame being concavely formed in the casing, the fixing frame comprising a lateral wall and a bottom part, the bottom part being extended from the lateral wall, the touchpad module being installed within the fixing frame, the touchpad module comprising:
 a base plate;
 a touch member located over the base plate, and comprising a covering plate and a circuit board, wherein the covering plate is located over the circuit board, the covering plate comprises an edge part, and the edge part of the covering plate is supported on the bottom part of the fixing frame, and the circuit board is laterally adjacent to the bottom part of the fixing frame;
 a supporting element arranged between the base plate and the touch member; and
 at least one pressure sensing element installed on the touch member and electrically connected with the circuit board, wherein while the touch member is pressed in response to an external pressing force, the touch member is bent downwardly by using a junction between the edge part of the covering plate and the bottom part of the fixing frame as a fulcrum, wherein while the touch member is bent downwardly, the base plate is pushed by the touch member through the supporting element, so that the base plate has a displacement amount, wherein according to the displacement amount of the base plate, the pressing force exerted on the touch member is sensed by the at least one pressure sensing unit, and the pressure sensing unit issues a pressure sensing signal.

9. A computing device, comprising:
 a casing, wherein a fixing frame is concavely formed in the casing, the fixing frame comprises a lateral wall and a bottom part, and the bottom part is extended from the lateral wall;
 a processor disposed within the casing; and
 a touchpad module disposed within the fixing frame and electrically connected with the processor, wherein the touchpad module comprises:
  a touch member comprising a covering plate and a circuit board, wherein the covering plate is located over the circuit board, the covering plate comprises an edge part, and the edge part of the covering plate is supported on the bottom part of the fixing frame, and the circuit board is laterally adjacent to the bottom part of the fixing frame; and
  at least one pressure sensing element installed on the touch member and electrically connected with the circuit board, wherein while the touch member is pressed in response to an external pressing force, the touch member is bent downwardly by using a junction between the edge part of the covering plate and the bottom part of the fixing frame as a fulcrum, so that the touch member has a deformation amount, wherein according to the deformation amount of the touch member, a magnitude of the pressing force exerted on the touch member is sensed by the at least one pressure sensing unit, and the pressure sensing unit issues a pressure sensing signal.

10. A computing device, comprising:
 a casing, wherein a fixing frame is concavely formed in the casing, the fixing frame comprises a lateral wall and a bottom part, and the bottom part is extended from the lateral wall;
 a processor disposed within the casing; and
 a touchpad module disposed within the fixing frame and electrically connected with the processor, wherein the touchpad module comprises:
  a base plate;
  a touch member located over the base plate, and comprising a covering plate and a circuit board, wherein the covering plate is located over the circuit board, the covering plate comprises an edge part, and the edge part of the covering plate is supported on the bottom part of the fixing frame, and the circuit board is laterally adjacent to the bottom part of the fixing frame;
  a supporting element arranged between the base plate and the touch member; and
  at least one pressure sensing element installed on the touch member and electrically connected with the circuit board, wherein while the touch member is pressed in response to an external pressing force, the touch member is bent downwardly by using a junction between the edge part of the covering plate and the bottom part of the fixing frame as a fulcrum, wherein while the touch member is bent downwardly, the base plate is pushed by the touch member through the supporting element, so that the base plate has a displacement amount, wherein according to the displacement amount of the base plate, a magnitude of the pressing force exerted on the touch member is sensed by the at least one pressure sensing unit, and the pressure sensing unit issues a pressure sensing signal.

11. The touchpad module according to claim 1, wherein the edge part of the covering plate is in contact with the bottom part of the fixing frame.

12. The touchpad module according to claim 1, wherein the bottom part of the fixing frame defines an opening for accommodating the circuit board.

13. The touchpad module according to claim 12, wherein the opening is a through opening.

14. The touchpad module according to claim 1, wherein the bottom part of the fixing frame has a width less than a width of the circuit board.

15. The touchpad module according to claim 1, wherein the lateral wall and the bottom part of the fixing frame define a recess for accommodating the covering plate, and the recess has a depth less than a thickness of the touch member comprising the covering plate and the circuit board.

16. The touchpad module according to claim 8, wherein the edge part of the covering plate is in contact with the bottom part of the fixing frame.

17. The touchpad module according to claim 8, wherein the bottom part of the fixing frame defines an opening for accommodating the circuit board.

18. The touchpad module according to claim 17, wherein the opening is a through opening.

19. The touchpad module according to claim 8, wherein the bottom part of the fixing frame has a width less than a width of the circuit board.

20. The touchpad module according to claim 8, wherein the lateral wall and the bottom part of the fixing frame define a recess for accommodating the covering plate, and the recess has a depth less than a thickness of the touch member comprising the covering plate and the circuit board.

* * * * *